Aug. 5, 1958     E. R. BERGMANN     2,846,054
EXTENSIBLE CONVEYORS

Filed Nov. 13, 1956     2 Sheets-Sheet 1

INVENTOR.
Ernst R. Bergmann
BY
Murray A. Gleeson
ATTORNEY

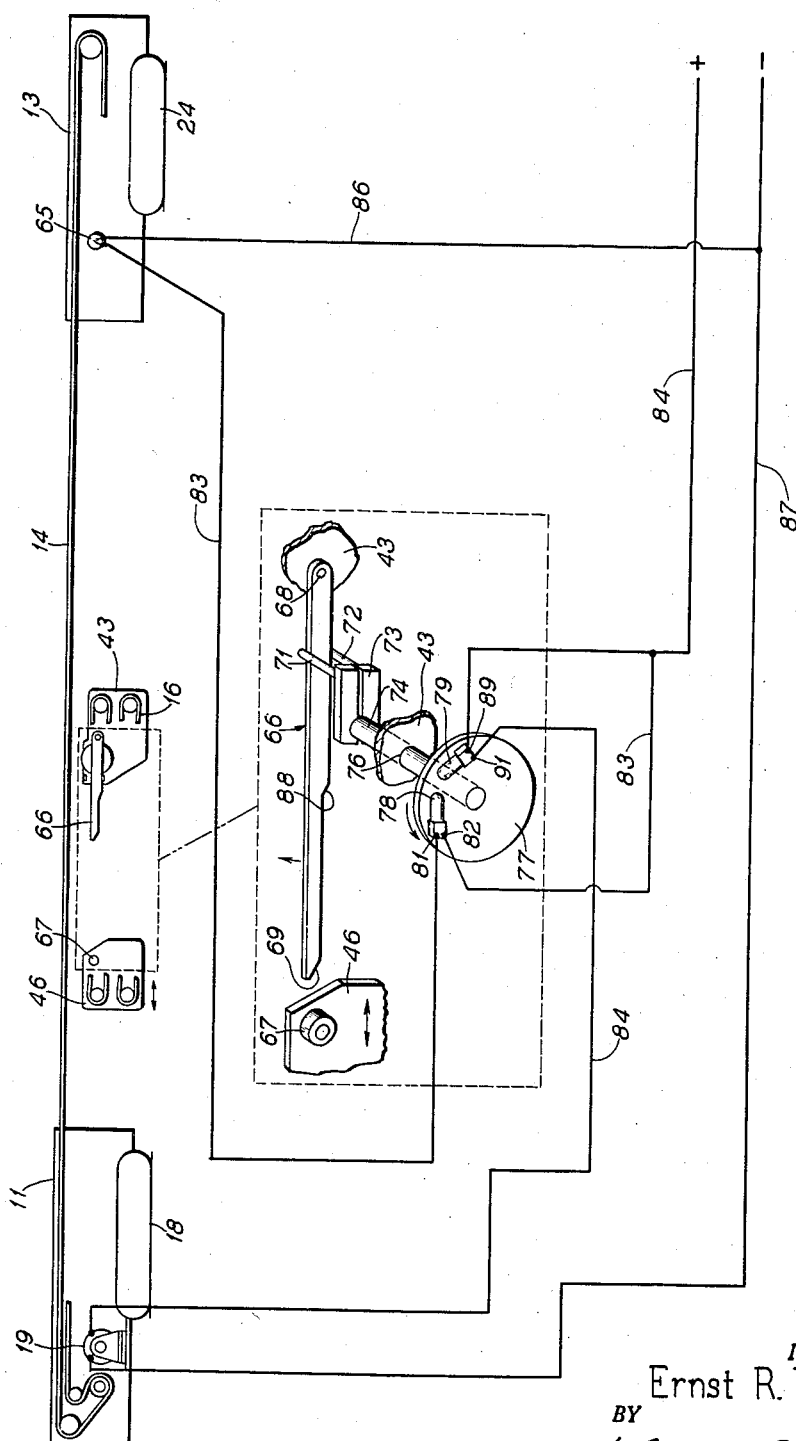

United States Patent Office 2,846,054
Patented Aug. 5, 1958

2,846,054

EXTENSIBLE CONVEYORS

Ernst R. Bergmann, Evergreen Park, Ill., assignor to Goodman Manufacturing Company, Chicago, Ill., a corporation of Illinois Application November 13, 1956, Serial No. 621,587

5 Claims. (Cl. 198—232)

This invention relates generally to extensible belt conveyors and more particularly to improvements in devices for preventing damage to the conveyor belt by the undue stretching thereof incident to lengthening the conveyor beyond a specified limit.

In underground mining operations where extensible belt conveyors follow the advance of continuous mining equipment, the outby or head section is usually maintained in stationary position at an entry, while the inby or tail section follows the advance of the working face. The storage loops of additional belting for extension of the conveyor are usually situated at the head section, and the head section may be so remote from the operator at the tail section that he cannot observe the condition of the belt storage loops, i. e., whether there is sufficient length in the storage loops to enable the tail section to be advanced without stretching the belt.

With the foregoing considerations in mind it is a principal object of this invention to provide a signaling device for an extensible belt conveyor which will notify the operator that the belt storage loops are approaching a condition where they will not be able to pay out any additional belting.

Another object is to provide a device for an extensible conveyor to signal to the operator that the limit of belt payout is imminent, and to stop the conveyor when such limit is reached thereby preventing damage to the belt.

Other objects and important features of the invention will be apparent from a study of the following specification taken with the drawings which together show and describe a preferred embodiment of the invention and what is now considered to be the best mode of practicing the principles thereof. Other embodiments may be suggested to those having the benefit of the teachings herein, and such other embodiments are intended to be reserved especially as they fall within the scope of the subjoined claims.

Figure 1:
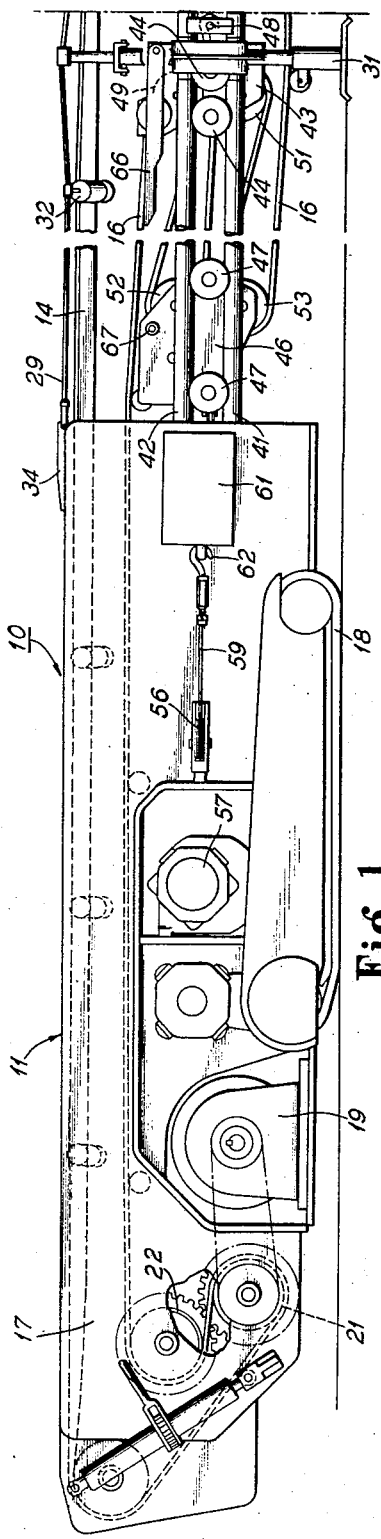
Fig. 1 is a side elevational view of the head section of an extensible conveyor having the improvements according to the present invention embodied therein.
Figure 2:
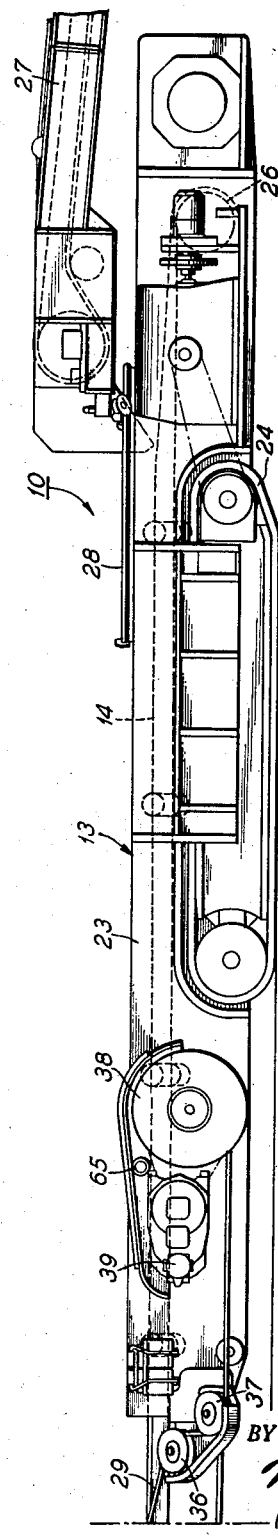
Fig. 2 is an elevational view of the tail section of such endless conveyor.
Figure 3:
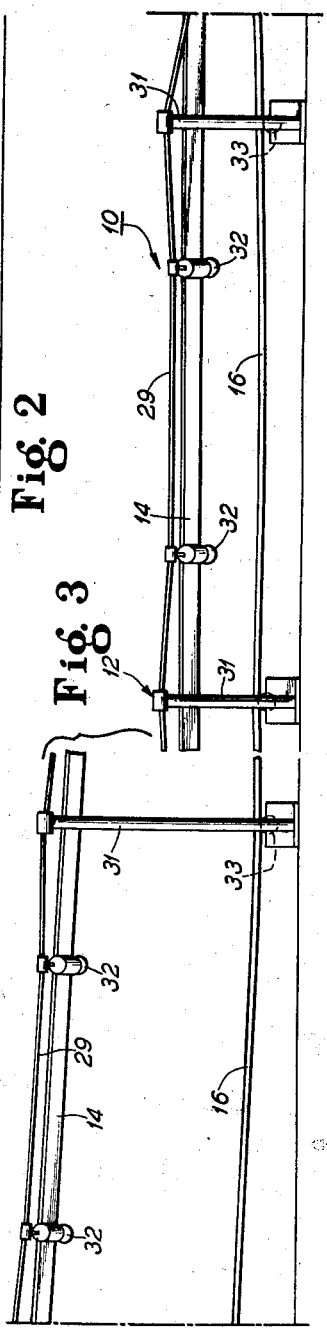

Fig. 3 is an elevational view of intermediate sections lying between the head section of Fig. 1 and the tail section of Fig. 2 for supporting and guiding both the conveying reach and the return reach of the endless belt of such conveyor; and Fig. 4 is a schematic elevational view of the extensible conveyor seen in Figs. 1 to 3 inclusive, and showing means for preventing the extension of the conveyor beyond a predetermined amount, and for giving a warning to the operator thereof of the imminence of the full extension of the conveyor.

Referring now to Figs. 1 to 3 of the drawings, there is shown an extensible belt conveyor indicated generally by the reference numeral 10 and consisting of a head or outby section 11, intermediate sections 12, and a tail or inby section 13. The three sections afford a means for guiding and driving an endless conveyor belt having a conveying reach 14 and a return reach 16.

The head section includes a frame 17 mounted for movement upon endless crawler treads 18. A driving motor 19 is mounted on the head section 11 and drives meshed pulleys 21 and 22 around which the endless belt is snubbed and driven thereby.

The outby or tail section 13 includes a frame 23 mounted upon crawler treads 24 and the endless belt 14 is reversed in its direction at the tail section about an inby idler pulley 26 disposed at the inby end thereof. A bridging conveyor 27 is mounted atop the inby or tail section 13 and is mounted for pivotal movement upon rails 28 with respect to a tail section 13, the bridging conveyor 27 discharging upon the conveying reach 14 at the inby section 13, and receiving material from a continuous miner or the like, not shown.

The conveying reach 14 is supported by laterally spaced flexible strands 29 which are supported at intervals upon standards 31. The two laterally spaced strands 29 are spanned at regular intervals by troughing roller assemblies indicated generally by the reference numeral 32, which assemblies together with the flexible strands 29 enable the conveying reach 14 to trough properly and to deflect in accordance with the load thereon.

As seen in Fig. 3, the support stands 31 have mounted thereon idler rollers 33 for supporting and guiding the return reach 16.

The support strands 29 are anchored at their outby end to anchor points 34 on the head section 11, and each strand 29 is reeved about guide sheaves 36 and 37 at the outby end of the tail section 13, the strand being wound upon a storage reel 38 driven by an hydraulic motor 39 and controlled in its operation as may be disclosed in an application of Ralph F. Risse, Serial No. 541,154, filed October 18, 1955, for Tensioning Device for Flexible Support Strands of an Endless Conveyor. The flexible strand 29 may accordingly be payed out from or reeled upon the winch 38 in accordance with the length of the extensible conveyor 10.

Means are provided in the form of relatively movable idler carriages around which the return reach is reeved in order to provide one or more belt storage loops. The head section 11 accordingly has extending therefrom upper and lower laterally spaced rails 41 and 42 which extend to a support standard next inby of the head section 11, additional lengths of such rails extending to successive inby support standards 31 according to the amount of extension of the conveyor. The details of such construction may be as shown in more detail in an application of Hardy and Ogden, Serial No. 545,162, filed October 18, 1955, for Extensible Conveyor.

The laterally spaced rails 41 and 42 accordingly provide a support for a fixed idler carriage 43 having wheels 44 moving between the rails 41 and 42, and a movable idler carriage 46 having wheels 47 moving between the rails 41, 42. The fixed carriage 43 is anchored as seen at 48, and includes spaced idler pulleys 49 and 51 around which the return reach of the belt is reeved. The movable idler carriage 46 likewise includes idler pulleys 52 and 53 around which the return reach 16 is also reeved, the two idler carriages 43 and 46 thereby having extending therebetween a portion of the return reach 16 to provide a plurality of belt storage loops.

The tension in the return reach is maintained at a desired value by means of a flexible cable 59 reeved around a sheave 56 anchored to a movable winch 57 and anchored to the head section 11. The winch 57 winds a cable 59 secured to the movable idler carriage, and the tension in cable 59 is determined by a limit switch 61 controlling the winch 57 connected at 62 to the cable 59 in a manner as shown in the aforesaid Hardy et al. application.

As the conveyor is extended by the advance of the tail section 13, the tail section pays out additional lengths of flexible strand 29, and the belt storage loops are correspondingly shortened by movement of the movable idler carriage 46 in a direction toward the fixed idler carriage 43, the tension in the flexible cable 59 being maintained at a proper value by the winch 57 under the control of the limit switch 61.

The tail section accordingly may advance a distance corresponding to the advance of the working face until the conveyor reaches a length where there is no further belt available from the storage loops. Continued extension of the conveyor could result in the endless belt being unduly stressed, or even broken by such extension, and means are accordingly provided which will indicate to the operator the shortening of the belt storage loop at the head section to a predetermined amount, although continued shortening will be thereafter permitted to a limited amount. Upon such latter condition the circuits controlling the driving of the belt will be deenergized to stop the belt to prevent damage thereto.

Referring now to Fig. 2 of the drawings the inby or tail section seen in Fig. 2 is provided with a warning light 65 which is controlled by a switch controlling lever 66, see Fig. 1, engaging a stop 67 on the movable idler carriage 46.

Referring now to Fig. 4 the lever 66 is pivoted at 68 to the fixed idler carriage 43. As the belt storage loop is shortened and the two carriages move toward each other during such shortening an inclined cam face 69 at the end of the lever 66 engages the stop 67 to rock the actuating lever 66 a slight amount in a clockwise direction. The actuating lever 66 is embraced by a pair of fingers 71 and 72 extending from a support 73 which is clamped to a shaft 74 turning in a bearing 76 on the fixed idler carriage 43. The other end of the shaft 74 supports a mounting plate 77 for a pair of mercury switches 78 and 79.

The initial engagement of the cam face 69 with the stop 67 will rock the actuating lever a slight amount in a clockwise direction through a small angle, at the same time rotating the shaft 74 in a counterclockwise direction through a larger angle. This initial rotation of the shaft 74 and the mounting plate 77 will cause contacts 81 and 82 of mercury switch 78 to be closed. The mercury switch 78 and its contacts 81 and 82 are connected in series with a lead 83 branching from a power lead 84 and in series with the lamp 65 at the tail section 13, the circuit being completed by a lead 86 to another power lead 87. During this movement of the movable idler assembly 46 towards the fixed idler assembly 43 the lamp 65 will be energized, indicating to the operator at the tail section 13 the fact that the belt storage loop has been shortened to an amount where only a small further extension of the conveyor can be had.

As the movable idler carriage 46 moves toward the fixed idler carriage 43 the switch controlling lever 66 will ride over the stop 67. The lever 66 is provided with a cam face 88 which will rock the shaft 74 through an angle sufficient to open contacts 89 and 91 of the mercury switch 79. This switch has its contacts 89 and 91 connected in series with the power lead 84, which is connected to the drive motor 19 for the endless belt, the circuit being completed through the drive motor 19 to the power lead 87. When the mounting plate 77 is rocked to this latter position to open the contacts 89 and 91 the drive motor 19 is deenergized, to stop the belt and prevent any damage thereto.

By way of example, the initial rocking movement of the switch controlling lever 66 may be of the order of one or two degrees, to give an initial angular displacement of approximately 30° of the mounting plate 77.

When the switch controlling lever 66 is rocked through an additional angular increment of from one to two degrees the mounting plate will at such time be rocked through an additional angle of 30°, during which time the opening of the mercury switch 79 will take place.

It will be seen that there has been provided useful improvement in the field of extensible belt conveyors which insures against damage to the conveying belt by reason of the shortening of the storage loops thereof beyond a predetermined amount. The apparatus according to the present invention also indicates to the operator the existence of such condition at the belt storage loop, so that the operator can place the conveyor in position for the insertion of an additional length of belting, at which time the belt storage loops can be restored to their initial length.

While the invention has been described in terms of a preferred embodiment thereof its scope is intended to be limited only by the claims here appended.

I claim as my invention:

1. In an extensible belt conveyor, head and tail sections including traction means whereby said sections are movable relative to each other, an endless belt having load carrying and return reaches trained for movement between said sections, means for driving said endless belt, a belt storage loop on the return reach of said endless belt including at least one pair of idlers around which said return reach is reeved and which are movable relative to each other, and means for signaling to an operator remote from said loop the shortening of said belt storage loop to a predetermined amount and for controlling the belt driving means operable to stop the same when said belt storage loop has reached a predetermined further shortened length, said means including a pair of switches, a switch controlling member supported at one of said relatively movable idlers, said switch controlling member actuating one of said switches to operate said signaling means to indicate the approach of said predetermined shortened length of said storage loop, said switch controlling member actuating the second of said switches when said storage loop has reached said predetermined further shortened length to deenergize said belt driving means.

2. In an extensible belt conveyor, head and tail sections including traction means whereby said sections are movable relative to each other, an endless belt having load carrying and return reaches trained for movement between said sections, means for driving said endless belt, a belt storage loop on the return reach including at least one pair of idlers around which said return reach is reeved and which are movable relative to each other, and means for signaling to an operator the shortening of said belt storage loop to a predetermined amount including a first circuit including a first switch connected therein for controlling the belt driving means and operable to stop the same when said belt storage loop has reached a predetermined further shortened length, a second circuit including a second switch connected therein and operable to energize said signaling means prior to the operation of said first named switch.

3. In an extensible belt conveyor, head and tail sections including traction means whereby said sections are movable relative to each other, an endless belt having load carrying and return reaches trained for movement between said sections, means for driving said endless belt, a belt storage loop on the return reach including at least one pair of idlers around which said return reach is reeved and which are movable relative to each other, and means for signaling to an operator the shortening of said belt storage loop to a predetermined amount and for controlling the belt driving means and operable to stop the same when said belt storage loop has reached a predetermined further shortened length, said means including a first switch operable upon movement of said idlers toward each other to energize said signaling means and a second switch operable upon further movement toward each other to stop said belt driving means.

4. In an extensible belt conveyor, head and tail sections including traction means whereby said sections are movable relative to each other, an endless belt having load carrying and retuch reaches trained for movement between said sections, means for driving said endless belt, a belt storage loop on the return reach of said endles belt including at least one pair of idlers around which said return reach is reeved and which are movable relative to each other, switch means including signal means controlled thereby for signaling to an operator remote from said loop the shortening of said belt storage loop to a predetermined amount, switch means operable to stop the belt driving means when said belt storage loop has reached a predetermined further shortened length, and means for controlling said switch means comprising a switch actuator supported on one of said pair of idlers and movable to positions determined by its proximity to the other of said pair of idlers.

5. In an extensible belt conveyor, head and tail sections including traction means whereby said sections are movable relative to each other an endless belt having load carrying and return reaches trained for movement between said sections, means for driving said endless belt, a belt storage loop on the return reach including at least one pair of idlers around which said return reach is reeved and which are movable relative to each other, switch means for signaling to an operator remote from said loop the shortening of said belt storage loop to a predetermined amount, a second switch means for controlling the belt driving means and operable to stop the same when said belt storage loop has reached a predetermined further shorter length than said predetermined amount, and means for controlling the operation of said switch means comprising a support for said switch means and means for rocking said support and said switch means to positions determined by the proximity of said idlers to each other.

References Cited in the file of this patent

UNITED STATES PATENTS

| | | |
|---|---|---|
| 432,040 | Haslam | July 15, 1890 |
| 1,574,914 | McNamara | Mar. 2, 1926 |
| 1,728,283 | Fisher | Sept. 17, 1929 |
| 2,640,582 | Madeira | June 2, 1953 |